United States Patent [19]
Jeppesen

[11] 3,810,370
[45] May 14, 1974

[54] APPARATUS FOR IMMOBILIZING A VEHICLE

[76] Inventor: Jerry J. Jeppesen, 2223 S.W. 114th, Seattle, Wash. 98146

[22] Filed: Oct. 24, 1972

[21] Appl. No.: 300,120

[52] U.S. Cl............................ 70/225, 70/259, 188/32
[51] Int. Cl............................ B60r 25/00, B60t 3/00
[58] Field of Search........... 70/18, 19, 225, 226, 259; 188/32

[56] References Cited
UNITED STATES PATENTS
3,695,071  10/1972  West..................................... 70/225
1,359,483  11/1920  Boswell............................ 224/42.25

FOREIGN PATENTS OR APPLICATIONS
227,102  4/1963  Austria................................. 70/259

Primary Examiner—Albert G. Craig, Jr.
Attorney, Agent, or Firm—Wells, St. John & Roberts

[57] ABSTRACT

An apparatus for immobilizing a wheeled vehicle, such as an automobile or truck. Designed particularly for use in the on-site impounding of the vehicle, the device includes diametrically opposed arcuate plates which are clamped to the periphery of a tire and which mount a protruding abutment which makes it impossible to rotate the tire about the wheel axis. A protective shield or cover overlaps the operative portions of the apparatus and makes the structure inaccessible to all but its user.

7 Claims, 7 Drawing Figures

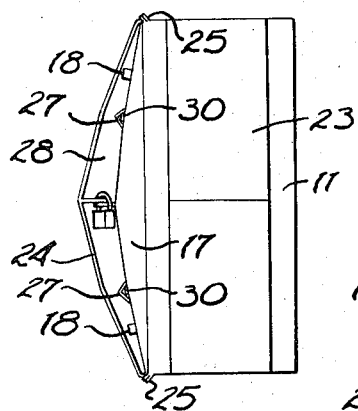
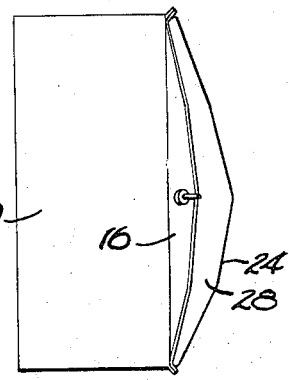
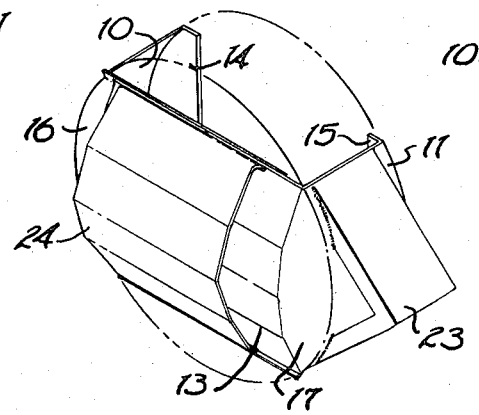
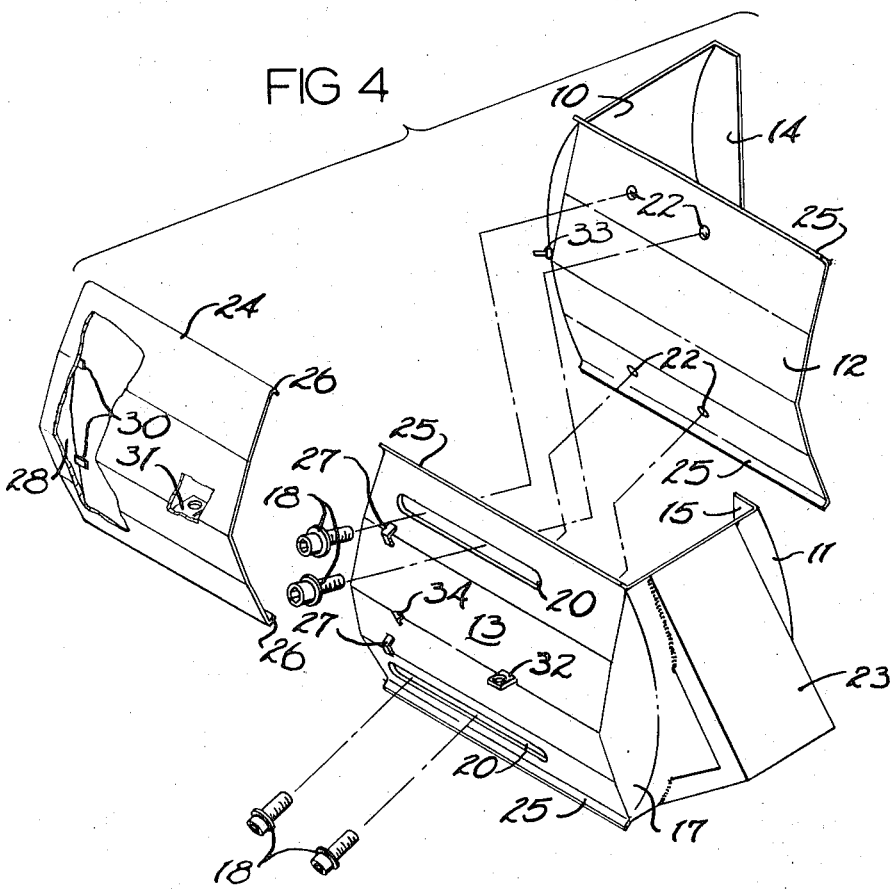

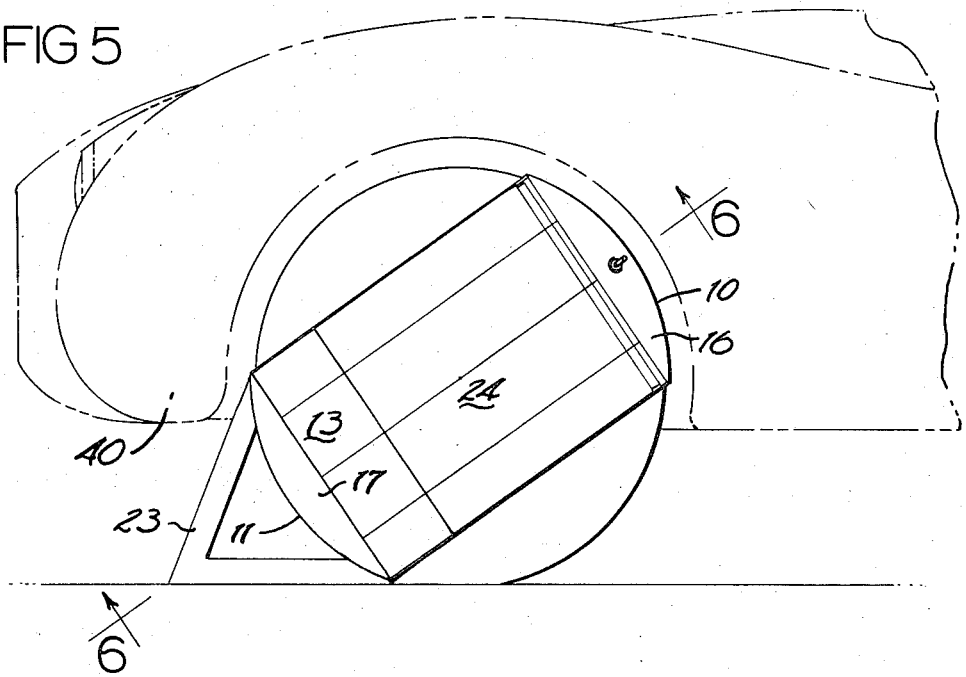
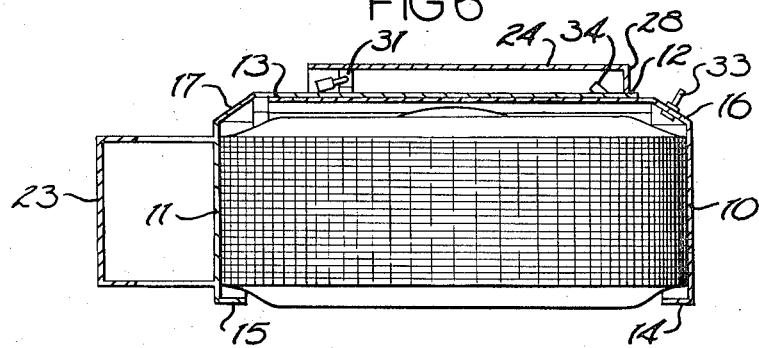
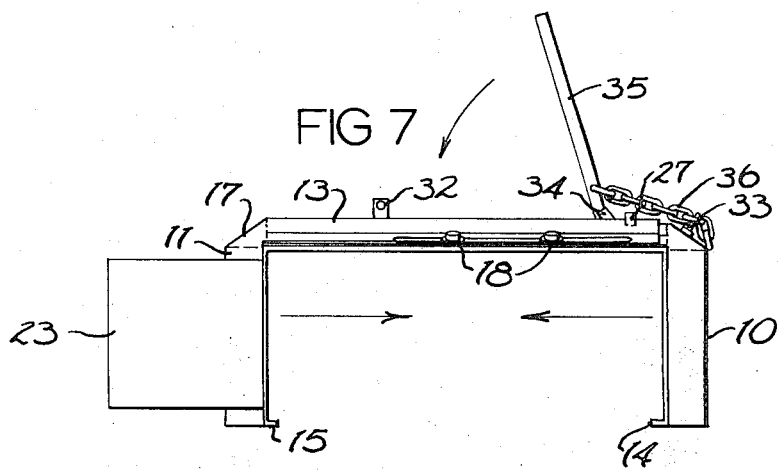

APPARATUS FOR IMMOBILIZING A VEHICLE

BACKGROUND OF THE INVENTION

The present invention arose from the needs of operators of parking lots for a practical way to impound vehicles where the vehicle has been left by its owner without full payment of parking fees. In the past, it has been common for such operators to impound the vehicle by moving or having it moved to a storage location where it will be released only after payment of substantial towing and parking storage fees. However, physical impounding of a vehicle in this manner is cumbersome for both the operator of a parking lot and for the owner of the vehicle. It is relatively expensive and imposes considerable inconvenience on the owner of the vehicle, who must frequently travel a considerable distance to the impounded storage lot. This arrangement sometimes results in the owner of a vehicle being deprived of use of his vehicle for substantial periods of time, particularly on weekends. In instances where there is question concerning the validity of the impounding procedure, it subjects the operator of the parking lot to the potential of substantial damages.

To simplify this procedure, many parking lot operators have devised various attachments which are secured to a vehicle on the site to thereby prevent the vehicle from being driven from the parking lot until satisfactory parking fees have been paid. A typical example is a large steel storage drum which is secured to the front or rear bumper of a vehicle by a padlocked link of chain. However, such devices are subject to damage and can be tampered with or removed from the vehicle by use of a hacksaw, bolt cutter, or other manual tools.

The present device is designed for attachment to a single wheel on a vehicle by clamping engagement against the periphery of a tire. It does not require any other contact with the vehicle which might cause any physical damage. It prevents rotation of the wheel and thereby effectively immobilizes the vehicle. When assembled, all working parts of the device are completely covered by protective smooth surfaces which prevent tampering or prying that might release the device from the wheel. It is extremely portable and can be readily placed on a wheel having any conventional tire size. While designed specifically for parking lot usage, it has application in other instances where a vehicle requires protection against theft, such as in an automobile display lot or sales lot.

SUMMARY OF THE INVENTION

The invention basically involves the use of first and second opposed transverse elements which can frictionally abut the periphery of a tire at diametrically opposite positions. The elements have complementary slide extensions formed along one side permitting radial spacing of the elements along the wheel diameter. Joining means in the form of bolts or equivalent devices operably engage the slide extensions to fix their positions relative to each other. An outer abutment projects radially from one element to prevent normal rotation of a wheel on a vehicle when the device is in place.

One object of this invention is to provide an impounding or immobilizing device for a vehicle which effectively prevents any party from releasing the device without authorization. All operative parts of the device are covered by a smooth-surfaced shield which prevents entry without proper release of a covered lock mechanism.

Another object of this invention is to provide an immobilizing device which is readily adjustable so as to fit the tires and wheels of all conventional automobiles and trucks.

Another object of this invention is to provide a relatively inexpensive impounding device which is capable of repeated use in open public areas such as unattended parking lots. The device is designed to prevent tampering or damage to the device and to discourage unauthorized persons from attempting to release it without proper access to the lock mechanism.

These and further objects will be evident from the following disclosure, taken together with the accompanying drawings which disclose a preferred form of the device.

DESCRIPTION OF THE DRAWINGS

FIG. 1 is a perspective view of the fully assembled immobilizing device, an outline of a tire being shown in phantom line;

FIG. 2 is an end view of the device shown in FIG. 1;

FIG. 3 is an end view opposite to FIG. 2;

FIG. 4 is an exploded perspective view of the device;

FIG. 5 is a side elevation showing use of the device on a vehicle wheel, with a typical fender outline being shown in phantom lines;

FIG. 6 is a longitudinal sectional view through assembled device as seen at 6—6 in FIG. 5; and FIG. 7 is a partially assembled longitudinal sectional view similar to FIG. 6, illustrating the manner by which the device can be tightened in place.

DESCRIPTION OF THE PREFERRED EMBODIMENT

As can be seen in FIGS. 1 and 5, the present device clamps about the outside of a vehicle tire to prevent the tire and wheel assembly on the vehicle from being rotated. It includes an outward abutment which prevents rolling of the tire and which cannot be rotated about the wheel axis without substantial damage to the surrounding body of the vehicle, particularly the overlapping fender. While the vehicle might be lifted and towed with the device in place, for all practical purposes it is effectively immobilized until the device is released by an authorized party having access to the lock mechanism that secures it in place.

The immobilizing device essentially comprises a pair of identical opposed arcuate plates 10, 11, which diametrically face one another at spaced locations. The plates 10, 11 are integrally joined to perpendicular outer extensions 12, 13, which extend longitudinally in overlapping sliding relationship to one another. The extensions 12, 13 are transversely arched for rigidity and to provide an inner recess providing clearance for central wheel hubs, covers or other configurations. The inner edges of plates 10, 11 have integral inwardly directed lips 14, 15 which serve as hooked flanges to prevent transverse movement of a tire by engagement of the inner sidewalls of the tire when in place. Suitable solid transition plates 16, 17 join the plates 10, 11 and extensions 12, 13 respectively. The transition plates 16, 17 form a solid wall between the arcuate plates 10, 11 and the perpendicular, transversely arched extensions 12, 13.

The sliding extensions 12, 13 permit longitudinal adjustment of the spacing between opposed plates 10, 11. Guidance for this sliding movement is provided by outwardly protruding bolts 18 which are threadably seated within apertures 22 formed through the extension 12 (FIG. 4). The bolts 18 protrude through longitudinal slots 20 formed through the extension 13 in directions parallel to the center diameter through plates 10, 11. Bolts 18 include inwardly facing shoulders which clamp against the outer surfaces of extension 13 to fix the two extensions 12, 13 relative to one another. When loosened, bolts 18 permit sliding adjustment of the extensions 12, 13 in a direction parallel to the center diameter intersecting plates 10, 11. The bolts 18 are preferably formed with a female socket at their outer ends, requiring a special tool to engage the polygonal socket recess. This allows the outer surface of each bolt 18 to be cylindrical, making it less likely that a party would have the tools required to turn bolts 18.

Fixed to the plate 11 is an outwardly protruding abutment 23, which is V-shaped in side elevation. The abutment 23 is formed from transverse plates which are joined along an apex coincident with the center diameter intersecting plates 10, 11. It prevents rotation of a tire on which the device is mounted and, because it is symmetrical, can be used when located either forward or rearward of the tire.

The overlapping portions of extensions 12, 13 are protected by an outer cover or shield 24, which has a continuous smooth outside surface preventing access to bolts 18, slots 20 and other portions of the device which might otherwise be accessible for tampering or damage. The cover 24 slidably engages extensions 12, 13 by means of bent lips 26 along its side edges which overlap longitudinal flanges 25 formed along the side edges of each extension 12, 13. Cover 24 is held to the outer extension 13 by complementary mounting brackets 27 and longitudinal ears 30, the ears 30 being slidably received under the brackets 27 when in place. The ears 30 extend inwardly from a transverse end plate 28 at one end of cover 24. The solid plate 28 prevents inward access through cover 24 at that end of the device.

Aligned ears 31, 32 on the cover 24 and extension 13 respectively, provide apertures through which a conventional padlock or other locking device is received to secure cover 24 to extension 13. The locking device can be manually placed under cover 24 through the open end facing the viewer in FIG. 2.

It is believed that the general manner of using the device is evident from the above description. It can be readily placed on a vehicle tire by one person without special assistance. A typical device made from substantial steel plate weighs about 40 pounds. With the bolts 18 loosened, the authorized user can spread plates 10, 11 so that the lips 14, 15 can be moved inwardly over the periphery of a tire, and located along the wheel axis. Plates 10, 11 are then pushed toward one another and bolts 18 are loosely tightened. Substantial clamping of the plates 10, 11 can be accomplished by the optional features shown in FIG. 7. As illustrated, an anchor pin 33 on extension 12 is used in conjunction with a brace 34 that protrudes outwardly from the extension 13. A stiff lever 35 and short length of chain 36 are used to provide manual leverage between the pin 33 and brace 34, resulting in the transmission of force between the extensions 12, 13 to draw plates 10, 11 toward one another and tightly abut the periphery of a tire.

The assembled device is shown in FIG. 5 as it would appear when mounted on a typical vehicle tire 37. With the device in place, the vehicle wheel 38 is prevented from being rotated without substantial damage to the surrounding body of the vehicle, a typical fender outline being shown at 40. The exterior of the device is smooth and presents no corners for prying or damage without proper release of the lock which joins the apertured ears 31, 32 inside the protective cover 24.

While the device provided effective immobilization of a vehicle, it can be readily removed by an authorized person, again without specialized tools other than a wrench complementary to the bolts 18, and the required key or combination for the lock that secures cover 24 in place. Thus, release can be accomplished at any time by an authorized person and a vehicle need not be immobilized over a long period as is the case when using impounding storage facilities. Furthermore, the expense to the parking lot operator is substantially decreased and the resulting damages that might be alleged by improper impounding procedures are substantially lessened.

Modifications might be made in the details of this structure without deviating substantially from the above disclosure. For these reasons, the illustrated structure is intended only by way of example, and such modifications are to be included within the scope of this discussion.

Having thus described my invention, I claim:

1. An apparatus for effectively immobilizing a rubber-tired wheeled vehicle, comprising:

first and second opposed transverse elements each adapted to frictionally abut a tire periphery at diametrically opposite locations relative to the wheel axis;

a pair of complementary slide extensions formed integrally with the respective transverse elements at right angles to said elements, said extensions overlapping one another for radial adjustment of element spacing relative to one another with respect to the wheel axis;

releasable joining means operably engageable between the pair of slide extensions for selectively fixing their positions relative to one another;

means projecting radially outward from one of said elements for preventing normal rotation of a wheel on a vehicle when said elements are in abutment with the tire periphery by providing an outer obstruction to such rotation;

and complementary means on said pair of slide extensions for permitting the application of manual leverage between them for radially tightening the transverse elements against the tire periphery.

2. An apparatus as set out in claim 1 wherein each element includes an inwardly-directed lip formed integrally therewith along its inner edge adapted to overlap the inner sidewall of a tire to prevent transverse movement of the elements when in abutment with a tire.

3. An apparatus as set out in claim 1 further comprising:

a cover plate removably secured to one of said slide extensions for selectively preventing manual access to said releasable joining means.

4. An apparatus for effectively immobilizing a rubber-tired wheeled vehicle by engagement of the periphery of one tire, comprising:

first and second opposed arcuate plates each having concave inner surfaces complementary to a tire periphery;

first and second complementary extensions formed integrally with the first and second arcuate plates respectively and extending inward along corresponding side edges of the respective plates, the extensions being formed from smooth-surfaced sheet material recessed to provide clearance for a wheel assembly and projecting wheel covers;

means for operably joining said extensions in an overlapping relationship with respect to one another with the respective plates diametrically opposed to one another;

an inwardly protruding lip along the remaining side edge of each plate adapted to retain the plate in place on a tire;

a smooth-surfaced solid cover plate removably mounted to one of said extensions for preventing manual access to said joining means when the cover plate is in place on said one slide extension;

locking means on said cover plate and said one extension for fixing the cover plate to said one extension;

and protruding means on one of said plates extending outward oppositely to the extension thereof for obstructing rotation of a wheel when said plates are in abutment with the tire periphery of the wheel.

5. An apparatus as set out in claim 4 wherein said extensions slidably adjust relative to one another along directions parallel to the center diameter through said plates.

6. An apparatus as set out in claim 4 wherein said extensions are slidable along a center diameter through said plates;

said means for joining said extensions comprising threaded bolts engaged in the innermost extension and protruding outward through slots in the outermost extension parallel to said center diameter, the bolts having shoulders facing inwardly for clamping engagement of the outermost extension adjacent said slots.

7. An apparatus as set out in claim 4 wherein said protruding means comprises a V-shaped abutment extending transversely across said one plate, the sides of the abutment being joined to one another along an apex coincident with a center diameter through the plates.

* * * * *